United States Patent
Sawhney et al.

(10) Patent No.: US 7,753,206 B2
(45) Date of Patent: Jul. 13, 2010

(54) NESTABLE MEASURING CUPS

(75) Inventors: Ravi Sawhney, Calabasas, CA (US);
Lance Gordon Hussey, Simi Valley, CA (US); Christopher Glupker, Van Nuys, CA (US); Hyun Suk Song, Fullerton, CA (US); Kurt Gregory Botsai, Thousand Oaks, CA (US)

(73) Assignee: Zyliss USA Corporation, Irvine, CA (US)

( * ) Notice: Subject to any disclaimer, the term of this patent is extended or adjusted under 35 U.S.C. 154(b) by 861 days.

(21) Appl. No.: 11/489,233

(22) Filed: Jul. 19, 2006

(65) Prior Publication Data

US 2008/0017540 A1    Jan. 24, 2008

(51) Int. Cl.
*B65D 85/62*    (2006.01)
*B65D 21/02*    (2006.01)
*G01F 19/00*    (2006.01)
*B65D 25/28*    (2006.01)

(52) U.S. Cl. .................... 206/514; 220/23.88; 220/756; 73/426

(58) Field of Classification Search ................. 206/514, 206/519, 516, 510, 507, 506, 505; 220/23.89, 220/23.88, 23.86, 769, 752, 761, 770, DIG. 13; D10/46.2, 46.3; 73/426; 16/111.1, 903; D7/393; D9/753, 443
See application file for complete search history.

(56) References Cited

U.S. PATENT DOCUMENTS

| | | | |
|---|---|---|---|
| 109,739 A * | 11/1870 | Huntly | 229/120.01 |
| 695,167 A * | 3/1902 | McGriff | 73/426 |
| 1,507,968 A | 9/1924 | Johnson | |
| 2,165,045 A | 7/1939 | Garside | |
| 2,507,425 A * | 5/1950 | Swartout | 220/592.28 |
| 2,564,834 A * | 8/1951 | Devine et al. | 206/505 |
| 3,030,812 A | 4/1962 | Lutz | |
| 3,134,264 A * | 5/1964 | Miller | 73/429 |
| D210,047 S | 1/1968 | Manderfield | |
| 3,363,469 A * | 1/1968 | Crane | 73/429 |
| 3,381,849 A | 5/1968 | Karlsson | |
| 3,400,591 A | 9/1968 | Larson | |
| 3,526,138 A | 9/1970 | Swett et al. | |
| 3,700,146 A | 10/1972 | Cousins et al. | |
| 3,896,928 A * | 7/1975 | Forte | 206/779 |
| 4,079,629 A | 3/1978 | Hope | |
| 4,136,022 A | 1/1979 | Hutzler et al. | |
| 4,420,081 A | 12/1983 | Dart | |
| D287,324 S | 12/1986 | Schmidt | |
| D294,213 S * | 2/1988 | Chasen | D10/46.2 |
| 4,951,832 A * | 8/1990 | Tenney et al. | 220/23.83 |
| D316,529 S * | 4/1991 | Beckman, Sr. | D10/46.2 |
| 5,137,316 A | 8/1992 | Foos | |
| 5,203,836 A | 4/1993 | Brazis et al. | |
| 5,219,419 A * | 6/1993 | Prothe | 206/515 |

(Continued)

*Primary Examiner*—Anthony Stashick
*Assistant Examiner*—Robert J Hicks
(74) *Attorney, Agent, or Firm*—Brinks Hofer Gilson & Lione (57) ABSTRACT

A measuring cup being nestable within another measuring cup is provided. Each nestable measuring cups includes a cup portion and a handle extending from the cup portion. The handle of one measuring cup is receivable within a channel formed in the handle of the other measuring cup. The measuring cups can be sized to receive different volumes of material, and smaller measuring cups can be disposed within the larger measuring cups in a stacked, nestable manner.

9 Claims, 9 Drawing Sheets

U.S. PATENT DOCUMENTS

| | | |
|---|---|---|
| 5,235,853 A | 8/1993 | Froes |
| 5,397,036 A * | 3/1995 | Maiwald .................... 222/475 |
| 5,784,953 A | 7/1998 | Wang |
| D418,068 S | 12/1999 | Robbins, III |
| D437,793 S | 2/2001 | Kaposi et al. |
| D438,125 S | 2/2001 | Kaposi et al. |
| D440,164 S | 4/2001 | Kerr |
| D450,605 S | 11/2001 | Wright |
| D473,148 S | 4/2003 | Kleckauskas et al. |
| 6,543,284 B2 | 4/2003 | Hoeting et al. |
| 6,769,302 B1 | 8/2004 | King et al. |
| 6,886,694 B2 * | 5/2005 | McNeeley et al. .......... 206/505 |
| 2001/0042402 A1 * | 11/2001 | Hoeting et al. ................ 73/427 |
| 2005/0247129 A1 | 11/2005 | Carragan |

\* cited by examiner

NESTABLE MEASURING CUPS

The present invention relates to a container, and more particularly to one or more measuring cups that are nestable and stackable.

BACKGROUND

Measuring cups are commonly used commercially and domestically for various activities involving the measuring of different materials, such as during food preparation. Typically, such cups are sold as a set, comprised of differently sized cups. The measuring cups may also be nestable, in that the smallest cup fit into the next largest, etc., such that the entire set may be stored inside the largest of the cups. This nestability reduces the storage space necessary for multiple measuring cups.

Generally, commercially available measuring cups may be molded of a plastic material or pressed from metal. Some measuring cups may have a circular cross-section, wherein the sidewall of a measuring cup extends from the bottom surface to form a top edge. The measuring cups may include a spout formed outwardly from the top edge, typically at a position opposite a handle.

The addition of a handle to the side of the measuring cup opposite the spout may sometimes not be practical because the handle may either impede, or render difficult, the nesting of one measuring cup within another. Similarly, the outward projecting spout may also interfere with the nestability of measuring cups. Thus, addition of successive measuring cups during stacking often increases the storage space necessary for the overall configuration of stacked measuring cups.

What is needed is a measuring cup that is easily and conveniently nested with one or more other measuring cups of various sizes.

SUMMARY

In one aspect of the present invention, a set of measuring cups is provided. The set of measuring cups comprises a first measuring cup having a first cup portion and a first handle. The first handle including a channel formed therein. The set of measuring cups further includes a second measuring cup having a second cup portion and a second handle, wherein the second measuring cup is nestable at least partially within the first measuring cup such that the second handle is at least partially disposable within the first handle.

In another aspect of the invention, a method of stacking measuring cups is provided. The method includes providing a first measuring cup having a first cup portion and a first handle, wherein the first handle includes a channel. The method further includes providing a second measuring cup having a second cup portion and a second handle. The method also includes placing at least a portion of the second cup portion within the first cup portion, wherein at least a portion of the second handle is receivable within the channel.

Advantages of the present invention will become more apparent to those skilled in the art from the following description of the preferred embodiments of the invention which have been shown and described by way of illustration. As will be realized, the invention is capable of other and different embodiments, and its details are capable of modification in various respects. Accordingly, the drawings and description are to be regarded as illustrative in nature and not as restrictive.

DESCRIPTION OF THE INVENTION

FIGS. 1-5 depict one exemplary embodiment of a nestable measuring cup 10 in accordance with the present invention. For ease of reference but without limiting the scope of the claims, the present invention will be described in connection with the measuring cup 10 of the type shown in FIG. 1. The measuring cup 10 includes a cup portion 12 and a handle 14. The cup portion 12 includes a side wall 16 that extends from a base 18 to an upper edge 28. The handle 14 is attached to the side wall 16 of the cup portion 12. The measuring cup 10 may further include a spout 20 extending from the side wall 16 of the cup portion 12 at a position opposite the handle 14.

The spout 20 projects from the upper edge 28 of the side wall 16 to provide a rimmed surface for pouring material from the measuring cup 10, as illustrated in FIGS. 1-5. Measuring indicia 25 may be provided on the side wall 16 of the cup portion 12 to provide a visual representation of a volume of material within the cup portion 12. In an alternative embodiment, the indicia 25 may be disposed on the handle 14 or any other suitable location on the measuring cup 10 sufficient to provide the user with an accurate reading of the volume of material within the cup portion 12. The indicia 25 may be formed into the measuring cup 10, or the indicia 25 may be attached to either the inner or outer surface of the measuring cup 10. It will be understood by those skilled in the art that the indicia 25 may include varying units of measurement, such as metric units, positioned along the measuring cup 10 at varying intervals.

As illustrated in FIGS. 1-5, the measuring cup 10 may further include a bumper 24 or similar cushioning device for balancing the measuring cup 10 or protecting the surface of the measuring cup 10 whether in a singular or nested configuration. The bumper 24 can be formed of plastic, rubber, or any other material sufficient to provide the measuring cup 10 with a protective member attached to an outer surface of the measuring cup 10. The bumper 24 may also provide a frictional surface that is sufficient to inhibit, limit, and prevent the movement of the nestable measuring cup 10 relative to an adjacent measuring cup 10 when in a stacked configuration. The bumper 24 may be disposed adjacent to the outer surface of the side wall 16 of the cup portion 12, the handle 14, the base 18 and/or upper edge 28, or any other suitable position on the outer surface of the measuring cup 10. For example, when the bumper 24 is attached to the base 18, the bumper 24 can be configured to prevent the measuring cup 10 from unintentionally sliding from a surface, such as a table or from sliding relative to another measuring cup 10 when disposed within another measuring cup 10 in a stacked configuration. The bumper 24 may also provide a protective surface to prevent damage to the cup portion 12. When the bumper 24 is secured on the outer surface of the side wall 16, the bumper 24 may prevent scuffing to adjacently stacked measuring cups 10 by reducing the stresses from the impact of the measuring cups 10 if the measuring cups collide. Additionally, when the bumper 24 is attached to the handle 14, the bumper 24 provides friction relative to an adjacent measuring cup 10 in a stacked configuration by preventing the handle 14 of one measuring cup 10 from inadvertently slipping. However, the friction provided by the bumper 24 should not be so great as to prevent or inhibit relatively easy insertion or withdrawal of measuring cup into, or from, the nested configuration. When the bumper 24 is attached to the handle 14, the bumper 24 may provide a cushioned grip to which a user can grasp the measuring cup 10 for use thereof. The bumper 24 may be formed with the measuring cup 10 as a single piece such that the bumper 24 is integrally formed as part of the measuring cup 10 such as in an injection molding process, for example. The bumper 24 may also be attached to the measuring cup 10 by way of glue, heat welding, or any other manner of securing the bumper 24 to the measuring cup 10 sufficient to maintain the bumper 24 in the desired position on the measuring cup 10.

As shown in FIGS. 1-5, the lower portion of the side wall 16 forms a base 18. The side wall 16 extends upwardly from the base 18 thereby defining an opening for the measuring cup 10. The diameter of the side wall 16 increases as the side wall 16 extends from the base 18 to the upper edge 28. Thus, the side wall 16 may slope outwardly away from the base 18 so that a plurality of measuring cups 10 (FIG. 6) can be stacked within each other in a manner in which the cup portion 12 of each measuring cup 10 is disposed within the adjacent measuring cup 10. The nested measuring cups 10 are preferably of different sizes such that the largest measuring cup 10 is the outermost in the nested configuration and the smallest measuring cup 10 is the innermost. In an alternative embodiment, the side wall 16 of the measuring cup 10 may also extend in a substantially vertical manner from the base 18. The cross-section of the measuring cup 10 can be substantially circular, square, rectangular, oblong, or any other shape sufficient to allow multiple measuring cups 10 of different sizes to be stacked in a nested configuration.

Figure 1:
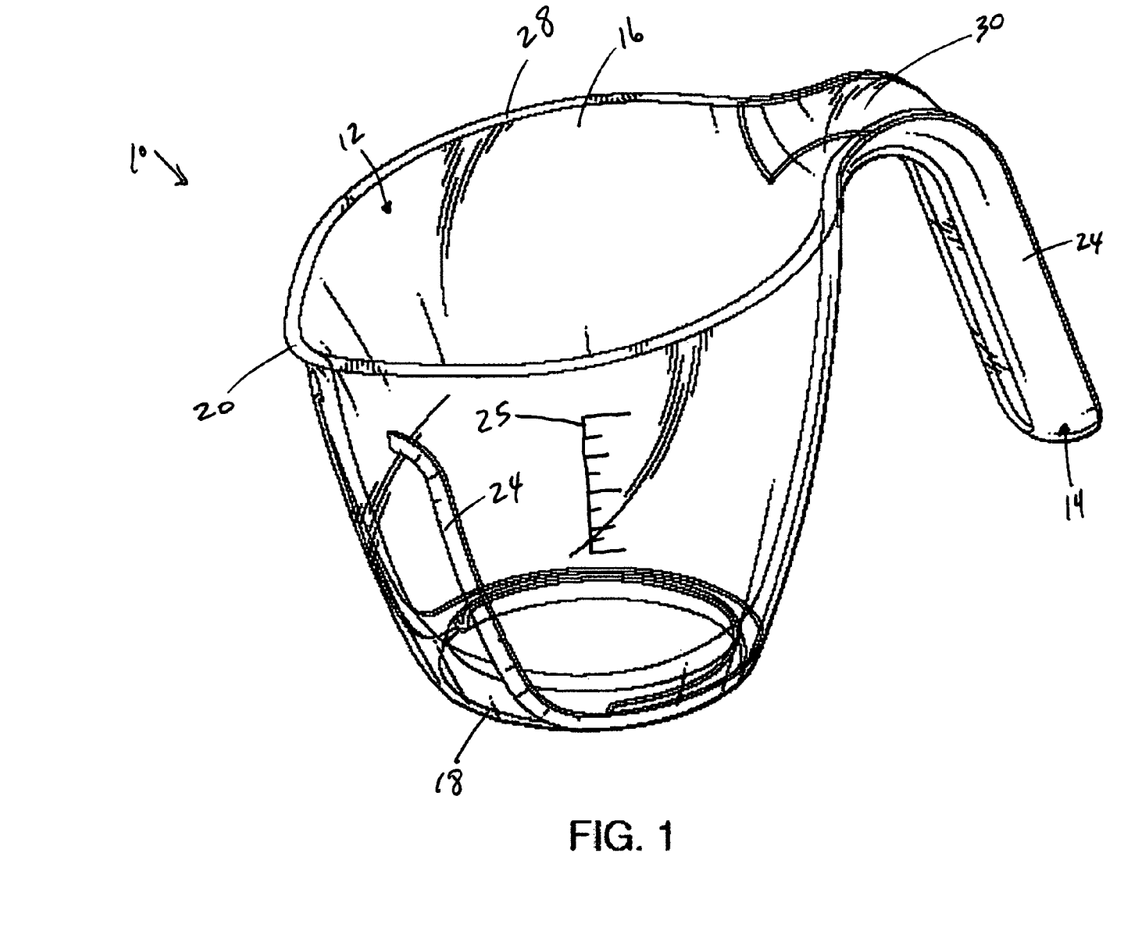
FIG. 1 shows a perspective view of a first embodiment of a measuring cup.
Figure 2:
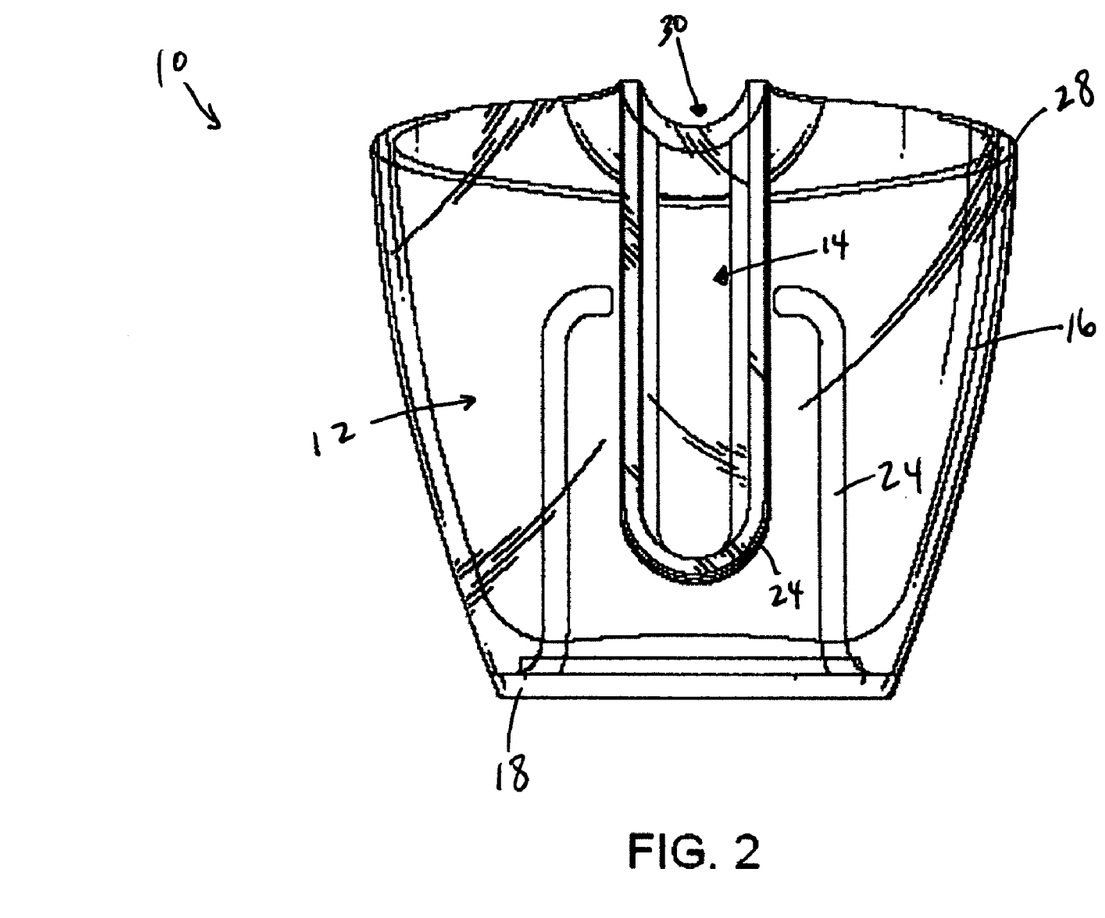
FIG. 2 shows a rear view of the measuring cup of FIG. 1.
Figure 3:
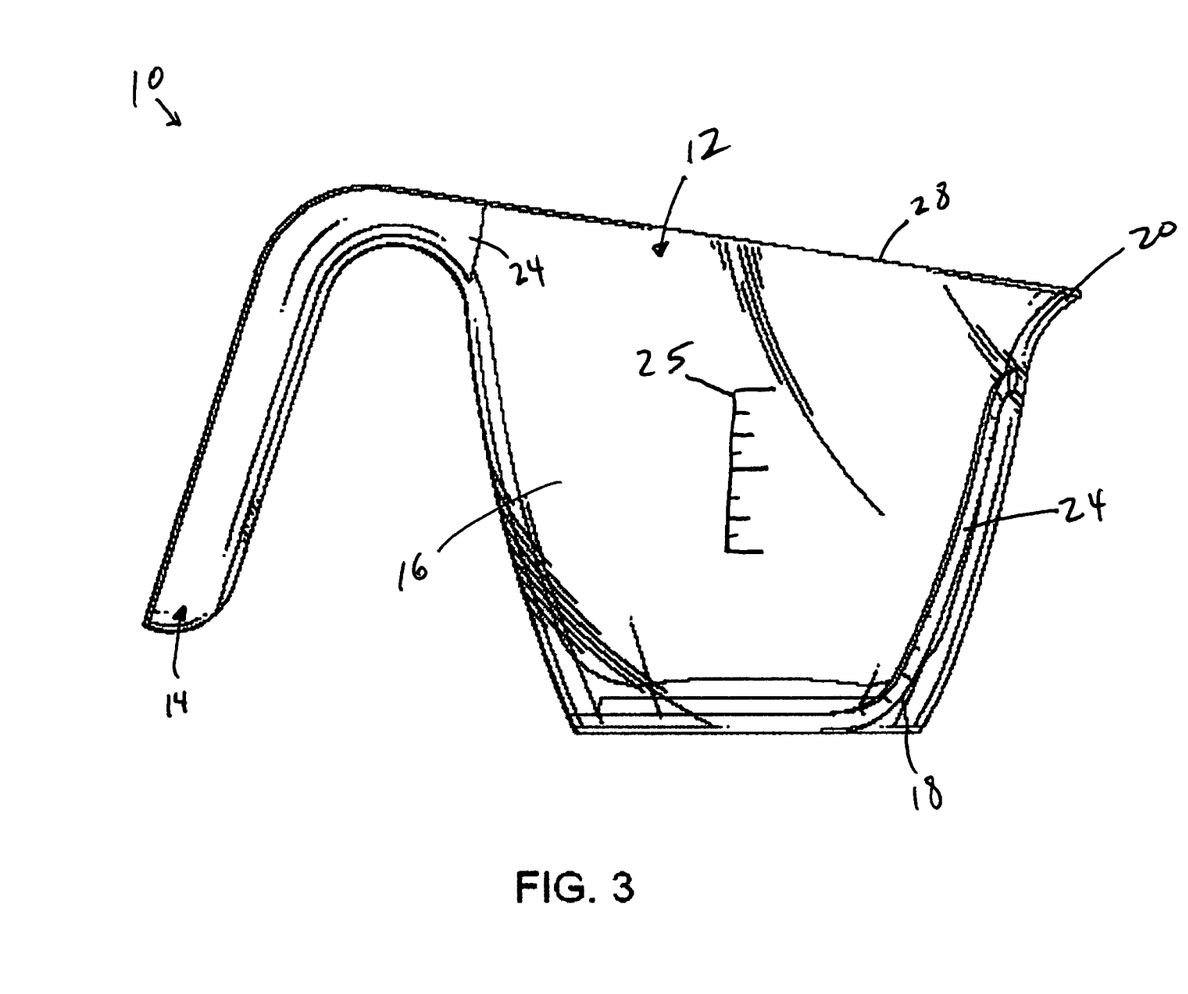
FIG. 3 shows a side view of the measuring cup of FIG. 1.
Figure 4:
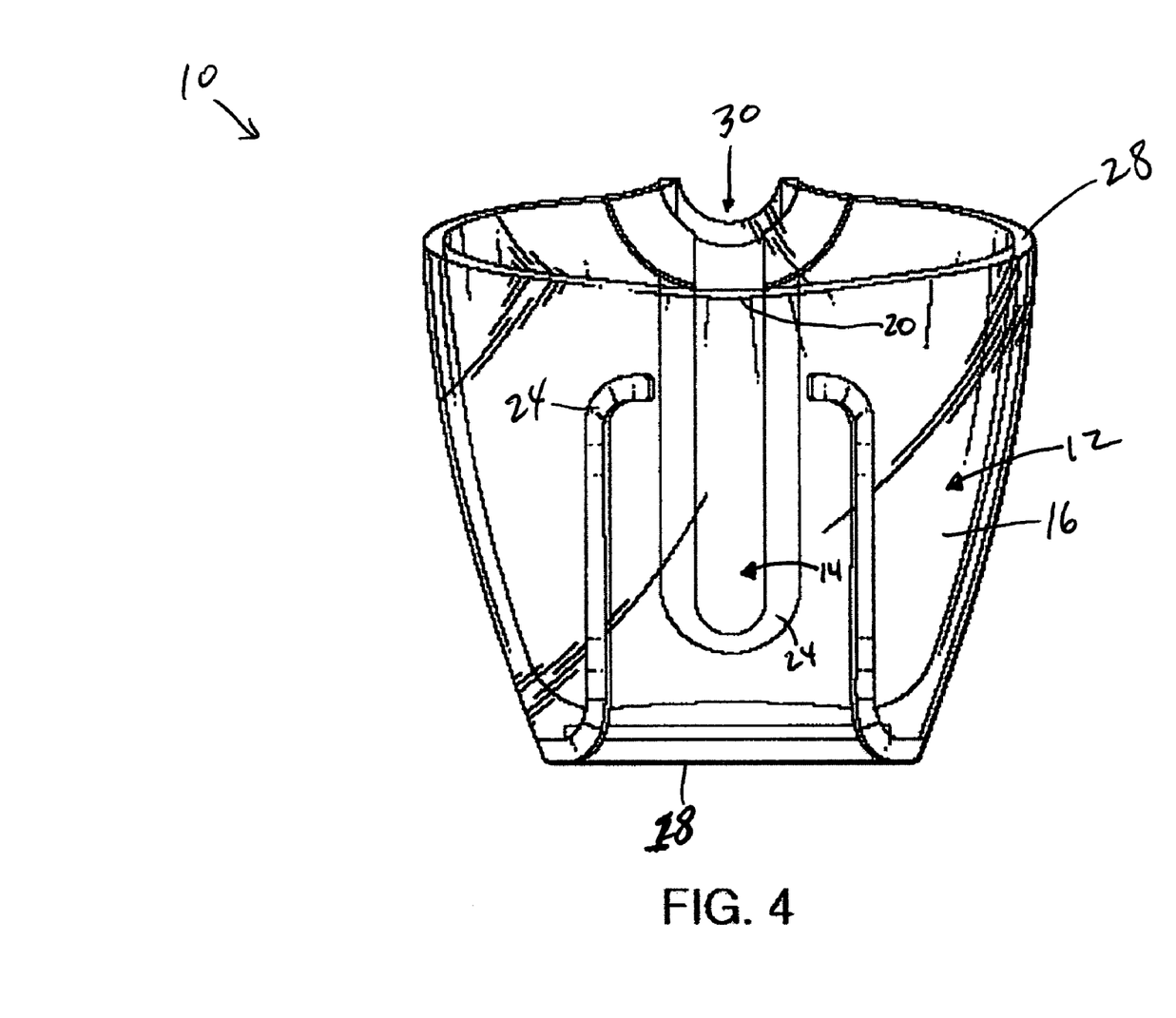
FIG. 4 shows a front view of the measuring cup of FIG. 1.
Figure 5:
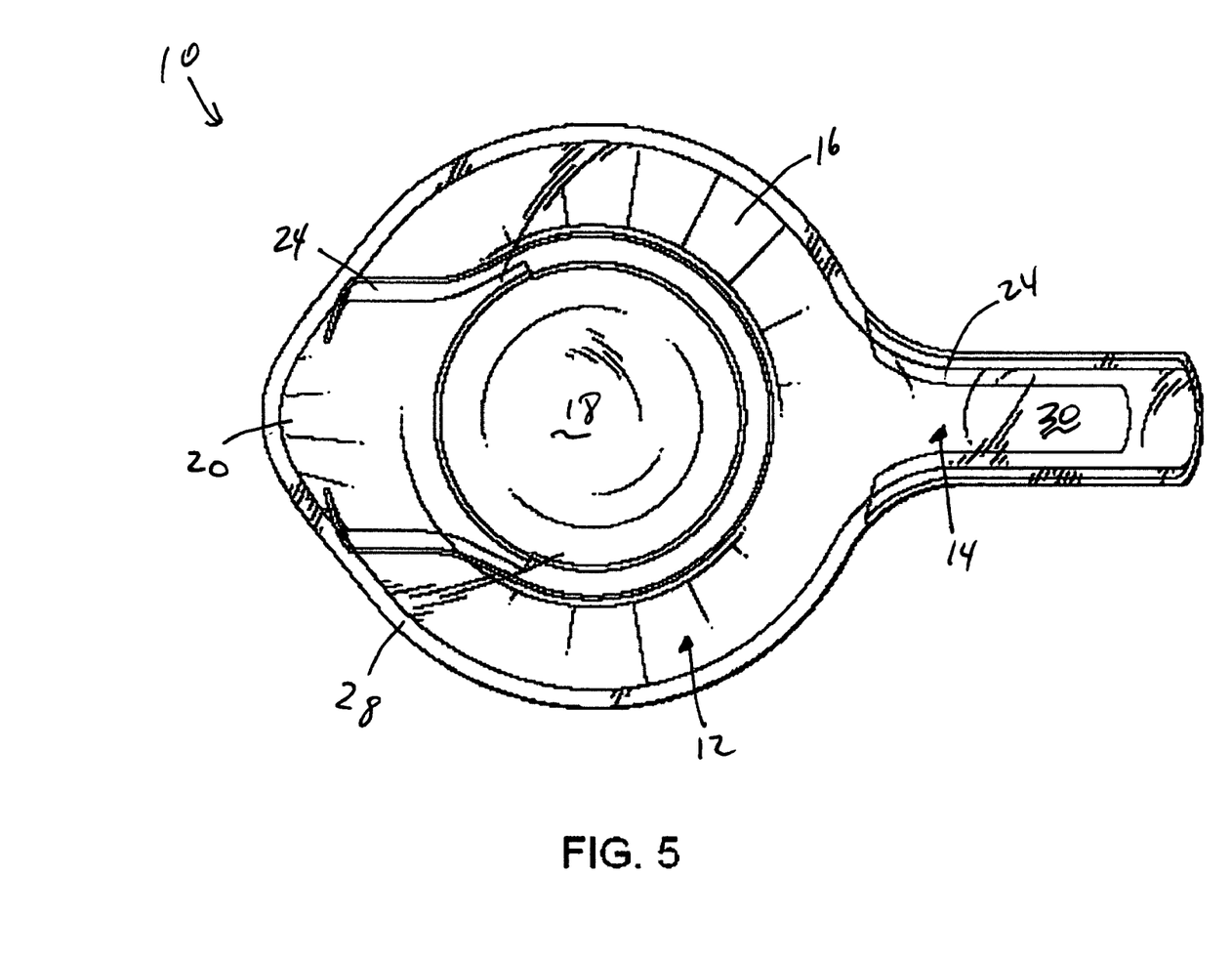
FIG. 5 shows a bottom view of the measuring cup of FIG. 1.

Referring now to FIGS. 2-3, the handle 14 can be integrally formed with the cup portion 12 of the measuring cup 10. In an alternative embodiment, the handle 14 can be removably attached to the cup portion 12. In one embodiment, the handle 14 extends laterally from the cup portion 12 then slopes downwardly at an angle relative to the side wall 16 of the measuring cup 10. The area formed between the handle 14 and the cup portion 12 allows a user to grasp the handle 14 in an ergonomic manner to allow for the material within the cup portion 12 to be easily poured. In an alternative embodiment, the handle 14 extends laterally from the cup portion 12 in a substantially horizontal manner. The handle 14 also provides a means of grasping the measuring cup 10 during usage or during storage. For example, the handle 14 can be grasped such that the measuring cup 10 can be used to scoop material into the cup portion 12. Alternatively, the handle 14 can be utilized to transport the measuring cup 10 after securing material in the cup portion 12 or for stacking the measuring cup 10 in a nested configuration. In the preferred embodiment, the handle 14 is attached to the cup portion 12 as a one-piece design, however, in an alternative embodiment, the handle 14 can be formed separately from the side wall 16 of the cup portion 12 and may be subsequently integrally attached to the side wall 16. For measuring cups 10 of different sizes configured to be stacked in a nested configuration, the ratio of the size of the handle 14 relative to the size of the cup portion 12 is substantially equal such that the distance that the handle 14 extends from the cup portion 12 of a smaller measuring cup 10 is less than the distance that the handle 14 extends from the cup portion of a larger measuring cup 10. However, it should be understood by one skilled in the art that the ratio of the size of the handle 14 relative to the cup portion 12 need not be substantially the same for various sizes of measuring cups 10 that are configured for nesting.

The handle 14 may include a channel 30 that extends at least a portion of the distance between a first end and a second end of the handle 14. In the preferred embodiment, the channel 30 extends along the entire length of the handle 14 from the location at which the handle 14 is attached to the cup portion 12 to the distal end of the handle 14. The handle 14 of each measuring cup 10 is configured to be received at least partially within the channel 30 of an adjacent measuring cup 10 when in a nested configuration. In the preferred embodiment, the entire handle 14 of a smaller measuring cup 10 can be received within the channel 30 of a larger measuring cup 10 when in a nested configuration. In an alternative embodiment, at least a portion of the handle 14 of a smaller measuring cup 10 can be received within the channel 30 of a larger measuring cup 10 when in a nested configuration. It should be understood by one skilled in the art that when more than two measuring cups 10 are in a nested configuration, the handle 14 of each successive smaller measuring cup 10 is receivable within the channel 30 of the next largest measuring cup 10. The channel 30 formed in the handle 14 transitions into the cup portion 12 such that the upper edge 28 of the side wall 16 extends downward in the shape of the channel 30 of the handle 14. This transition between the handle 14 and the cup portion 12 allows multiple measuring cups 10 to be stacked in a nested configuration.

Figure 6:
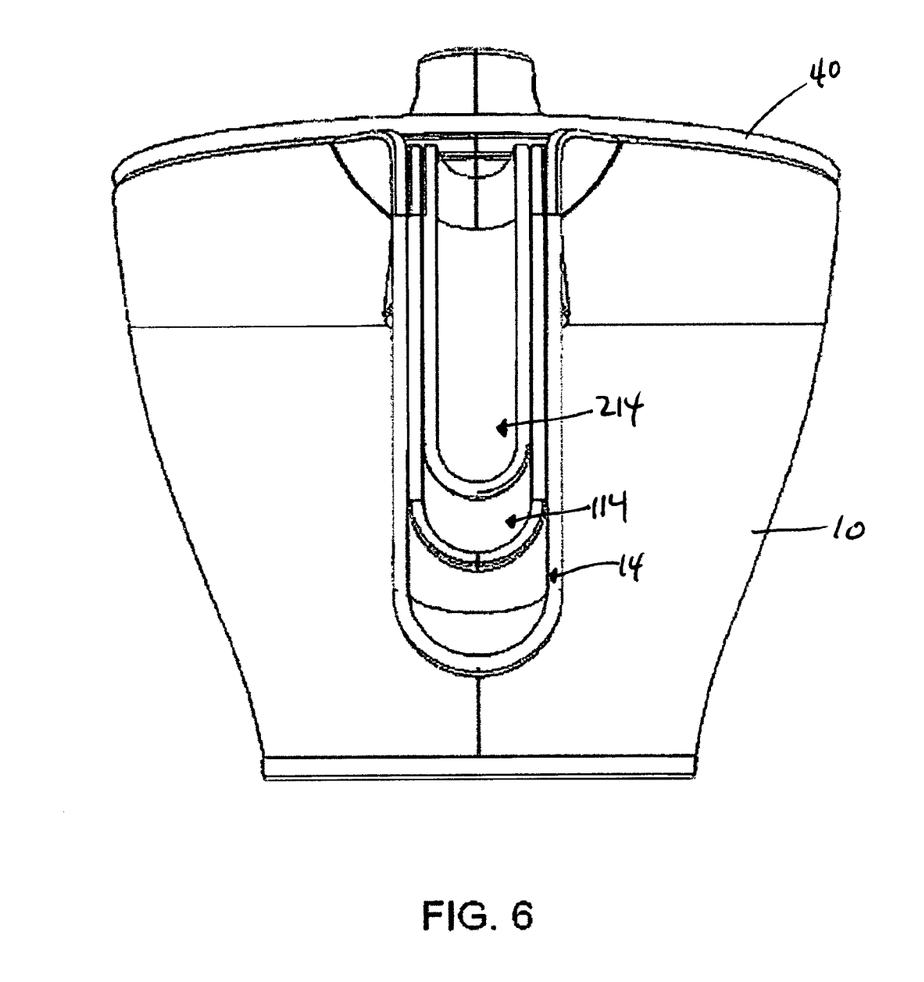
FIG. 6 shows a rear view of one embodiment of measuring cups in a stacked, nested configuration.

In one embodiment, the channel 30 of the handle 14 is formed as a concave, generally u-shaped semi-circular cross-section that extends from the position at which the handle 14 is attached to the cup portion 12 to the opposite end of the handle 14, as shown in FIGS. 1-5. In an alternative embodiment, the channel 30 extends only a portion of the distance between the end of the handle 14 and the position at which the handle 14 is attached to the cup portion 12. It should be understood by one skilled in the art that the channel 30 can be formed as a triangular, oblong, square, rectangular, or any other cross-sectional shape sufficient to receive the handle 14 of another measuring cup 10 such that the measuring cups 10 are nestable. The concave cross-section of the channel 30 allows additional measuring cups to be received within the cup portion 12 of the measuring cup 10 in a nested configuration without interference from the side wall 16. As shown in FIG. 6, when a smaller measuring cup 10 is stacked within a larger measuring cup 10, the channel 30 of the larger measuring cup 10 receives the outer surface of the handle 14 of the smaller measuring cup 10, thereby providing for the nestability of measuring cups 10 and their respective handles 14. In the preferred embodiment, the nestable handles 14 allow the overall thickness of the stacked measuring cups 10 in to be reduced because the handles 14 of successive measuring cups 10 are completely disposed within the channel 30 of the adjacent measuring cup 10 such that no portion of the handle 14 of the smaller measuring cup 10 extends beyond the perimeter formed by the outer edge of the channel 30 of the larger measuring cup 10. In an alternative embodiment, the nestable handles 14 reduce the overall thickness of the stacked measuring cups 10 because the handle 14 of the smaller measuring cup 10 is at least partially received within the channel 30 of the next largest measuring cup 10.

Referring to FIG. 3, the upper edge 28 of the side wall 16 is angled downwardly as the perimeter of the side wall 16 extends between the handle 14 and the spout 20 of the measuring cup 10. The sloping angle of the upper edge 28 of the side wall 16 provides guidance during the stacking of the measuring cup 10. Additionally, the sloping angle of the upper edge 28 of the side wall 16 assists during the pouring of material from the spout of the measuring cup 10. While the angle of the upper edge 28 is not critical, a preferred angle of about 15 degrees or less provides ease during the scooping of material into the cup portion 12 of the measuring cup 10.

Referring to FIGS. 6-9, a plurality of measuring cups 10, 100, 200 are shown in a nested configuration. In the nested configuration, the plurality of measuring cups 10, 100, 200 are positioned in a stacked, or nested, orientation wherein the cup portion and the handle of each measuring cup of each smaller measuring cup is nested within the cup portion of the next largest measuring cup. The measuring cups 10, 100, 200 can be formed of different sizes such that each of the different measuring cup 10, 100, 200 in the nested configuration can receive a different volume of material. In the exemplary embodiment shown, the nested configuration includes a second measuring cup 100 disposed within the first measuring cup 10 and a third measuring cup 200 nested within the second measuring cup 100. Both the second measuring cup 100 and the third measuring cup 200 are of similar proportions and volumes relative to the first measuring cup 10. It may be understood by one skilled in the art that the proportions of the various parts of the measuring cups 10, 100, 200 including, but not limited to the cup portion, handle, or spout may have different size ratios relative to a different size cup, but these ratios provide for ease of stackability of the different size measuring cups.

Figure 7:
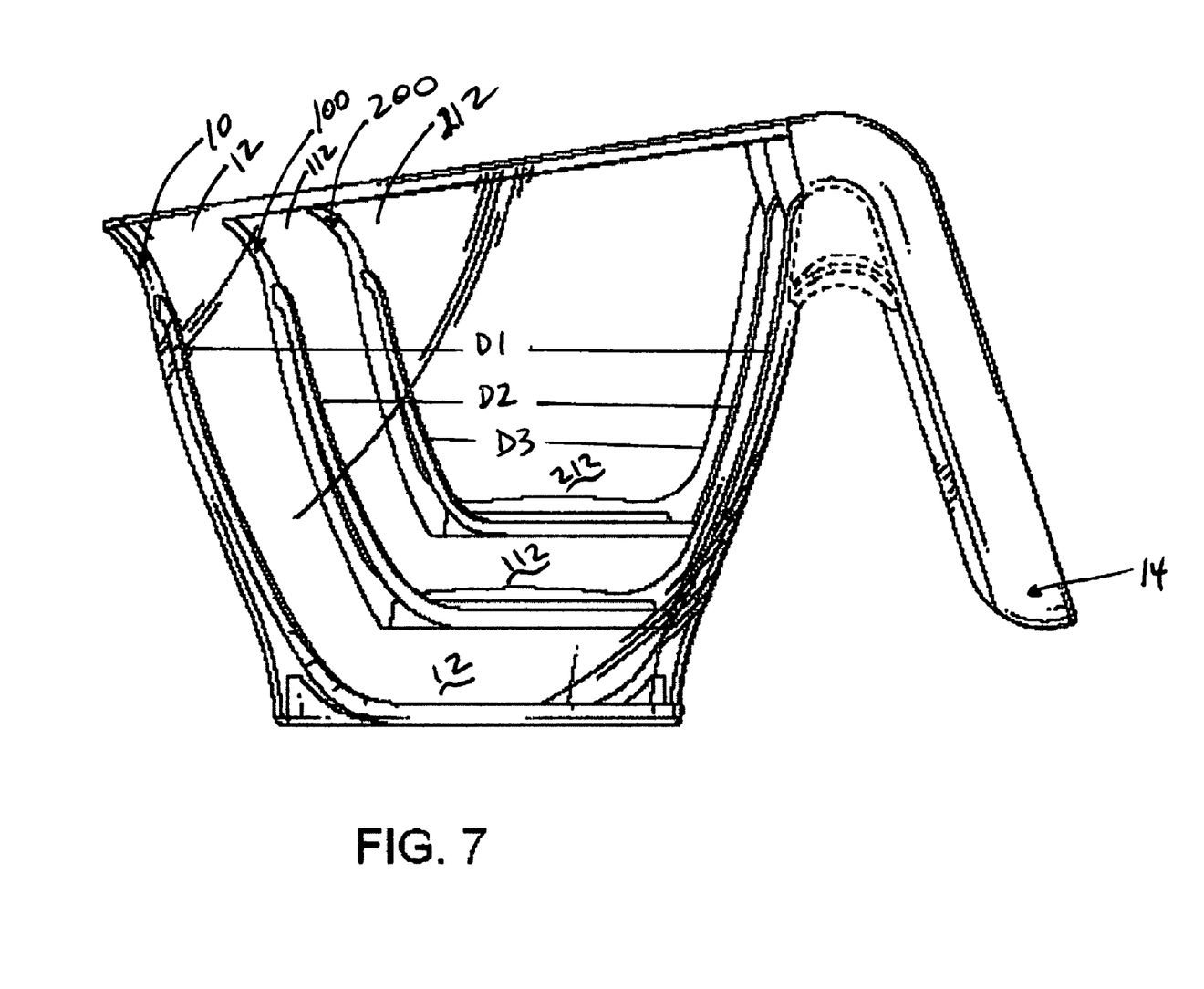
FIG. 7 shows a side view of the measuring cups of FIG. 6.
Figure 9:
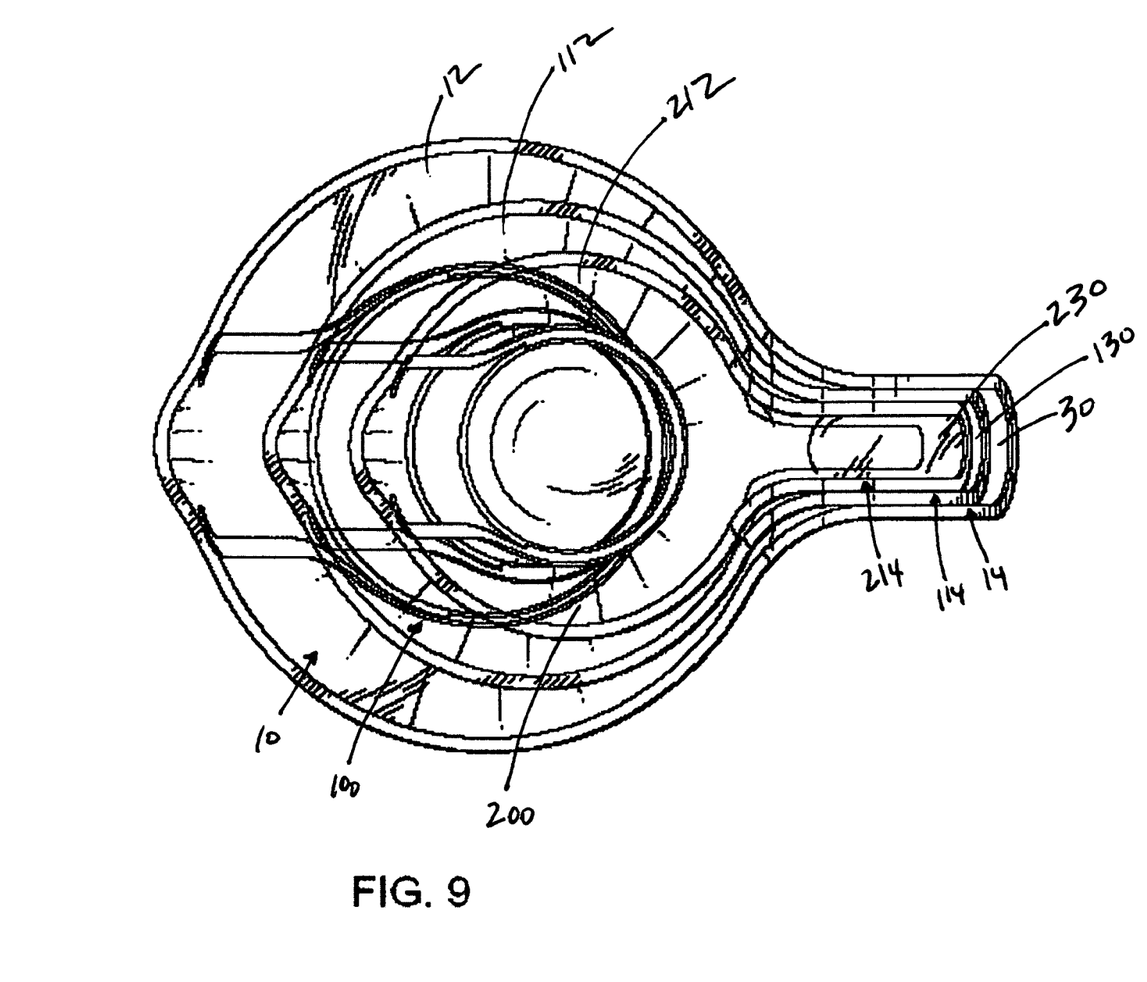
FIG. 9 shows a top view of the measuring cups of FIG. 8.

Referring to FIG. 7, the second measuring cup 100 includes a second cup portion 112 and a second handle 114 that includes a channel 130. The second cup portion 112 has a diameter D2 that is smaller than the diameter D1 of the cup portion 12 of the first measuring cup 10 which allows the second cup portion 112 to be securely nested within the cup portion 12 of the first measuring cup 10. Upon stacking, the second cup portion 112 is completely disposed within the cup portion 12 of the first measuring cup 10. In the stacked configuration, the second cup portion 112 is suspended within the cup portion 12 of the first measuring cup 10 in a cantilevered manner. As illustrated in FIG. 9, the handles 114, 214 of each measuring cup 100, 200 are received within the next largest handle 14, 114 such that the cup portion 112, 212 hang within the cup portion 12, 112 in a manner in which the side walls of the cup portions 12, 112, 212 do not contact each other. The cup portions 112, 212 are spaced apart from the cup portion 12, 112 in which they are disposed such that the cup portions 112, 212 can be suspended in a substantially cantilevered manner, and the area of contact between the smaller measuring cup 10, 100, 200 and the next largest measuring cup 10, 100, 200 is where the handle 14, 114, 214 transitions into the cup portion 12, 112, 212. When the cup portions 112, 212 are suspended within the next larger measuring cup 10, 100, the handles 14, 114, 214 may remain in contact with each other so as to maintain the cup portions 112, 212 in a hanging, or suspended, manner.

In one embodiment, the size and weight of the handle 114 of the second measuring cup 100 is substantially the same as the cup portion 112 such that the handle 114 and second cup portion 112 are evenly balanced at the point at which the handle 114 joins the cup portion 112 and the outer surface of the cup portion 112 is spaced apart from the inner surface of the cup portion 12 of the first measuring cup 10. The bumper 24 formed around the periphery of the channel 130 formed in the second handle 114 secures the second measuring cup 100 in a generally fixed position relative to the first measuring cup 10 when in a nested configuration by providing a gripping relationship between the second handle 114 and the handle 14 of the first measuring cup 10.

In an alternative embodiment, the size and weight of the handle 114 of the second measuring cup 100 is less than the cup portion 112 such that the cup portion 112 contacts the inner surface of the cup portion 12 of the first measuring cup 10. In another alternative embodiment, the size and weight of the handle 114 of the second measuring cup 100 is more than the cup portion 112 such that the cup portion 112 is spaced apart from the inner surface of the cup portion 12 of the first measuring cup 10. It should be understood by one skilled in the art that regardless of the weight ratio of the handle 114 relative to the cup portion 112, the handle 114 of the second measuring cup 100 is received in the channel 30 of the first measuring cup 10 when in the nested configuration. It should also be understood by one skilled in the art that the cup portion 112 of the second measuring cup 10 can be configured to contact the inner surface of the side wall 16 or the base 18 of the first measuring cup 10 when in the nested configuration. The third measuring cup 200 is adapted to be nested within the second measuring cup 100 in substantially the same manner as the second measuring cup 100 is nested within the first measuring cup 10. It should also be understood that any number of measuring cups can be nested within each other in a similar manner.

Similarly, the third measuring cup 200 comprises a third cup portion 212 and a third handle 214 includes a channel 230. The third cup portion 212 has a diameter D3 that is smaller than the diameter D2 of the second cup portion 112 of the second measuring cup 100. The smaller diameter D3 of the third cup portion 212 allows the third cup portion 212 to be nested within the second cup portion 112 of the second measuring cup 100, wherein the third cup portion 212 can be completely disposed within the second cup portion 112. Additionally, the third handle 214 is configured and sized to at least partially nest within the channel 130 of the second measuring cup 100. The nesting of the third handle 214 within the channel 130 of the second measuring cup 100 allows the overall thickness of the nested handles 14, 114, 214 in a nested configuration (FIG. 7) to remain less than the combined thickness of the handles 14, 114, 214 in a singular configuration or a nested configuration wherein the handles are not nestable. In the preferred embodiment, the handles 14, 114, 214 having a substantially semi-circular cross-sectional shape can be configured and sized in a generally concentric manner wherein the radius of curvature of the handles 14, 114, 214 share the same center point in the nested configuration, wherein the arc length of the channel 30, 130, 230 of each smaller measuring cup 10, 100, 200 is less than the next largest measuring cup such that the handles 114, 214 are completely disposed within the channel 30 of the first measuring cup 10.

In the preferred embodiment, the nested configuration is provided with three measuring cups (see FIG. 6), however, one skilled in the art should understand that other designs may utilize a various numbers of measuring cups of having different dimensions. For example, four, five, or more measuring cups can be stacked in a nested configuration as explained above with respect to the first, second, and third measuring cups 10, 100, 200.

The measuring cup 10 may be formed of thermoplastic materials such as polyethylene, polycarbonate, polypropylene or other suitable material. It should be understood by one skilled in the art that the measuring cup 10 may also be formed of glass, plastic, metal, or any other material sufficient to receive cooking materials without reacting with these materials. The measuring cups 10 can be formed by the process of being stamped, blow molded, injection molded or any other manufacturing method sufficient to produce measuring cups of different sizes and dimensions.

Figure 8:
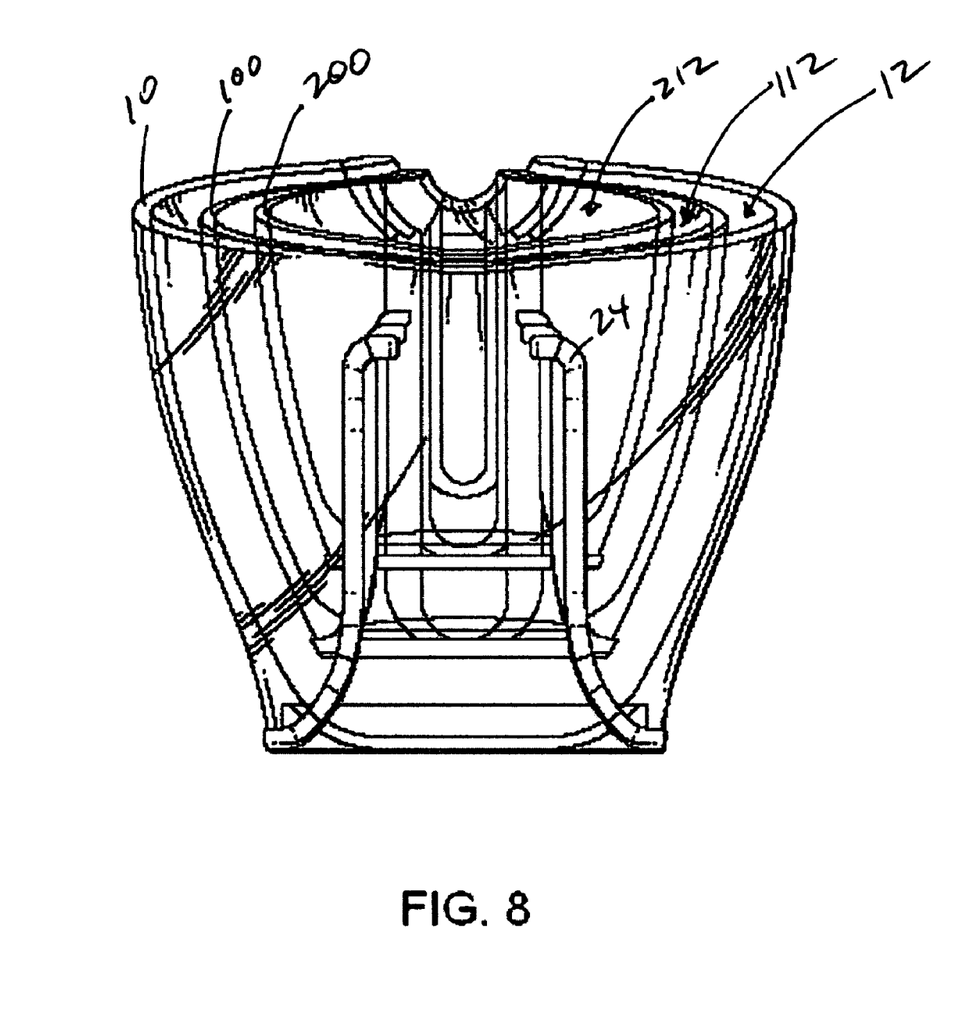
FIG. 8 shows a front view of the measuring cups of FIG. 6.

Referring to FIGS. 7-9, the measuring cup 10 may also include a lid 40 to seal material, or smaller measuring cups 100, 200, within the cup portion 12 of the largest measuring cup 10. The lid 40 can be disposed adjacent to the upper edge 28 of the side wall 16 to close the opening of the measuring cup 10. The lid 40 can engage the measuring cup 10 by way of a snap fit or screw lid or similar means of attachment. The lid 40 may also be formed of thermoplastic materials such as polyethylene and polycarbonate. Similarly, each smaller measuring cup 100, 200 can be provided with a separate or individual lid (not shown) to seal material into the cup portion for storage. Alternatively, other embodiments of the present invention can comprise designs with a lid having varying sizes and dimensions or eliminating a lid entirely.

Any other undisclosed or incidental details of the construction or composition of the various elements of the disclosed embodiment of the present invention are not believed to be critical to the achievement of the advantages of the present invention, so long as the elements possess the attributes needed for them to perform as disclosed. The selection of these and other details of construction are believed to be well within the ability of one of even rudimentary skills in this area, in view of the present disclosure. Illustrative embodiments of the present invention have been described in considerable detail for the purpose of disclosing a practical, operative structure whereby the invention may be practiced advantageously. The designs described herein are intended to be exemplary only. The novel characteristics of the invention may be incorporated in other structural forms without departing from the spirit and scope of the invention.

The invention claimed is:

1. A set of measuring cups, comprising;
   a first measuring cup having a first cup portion, a first handle, and a spout extending from said first cup portion at a position opposite of said first handle, said first handle including a channel formed therein and having a perimeter; and
   a second measuring cup having a second cup portion and a second handle, wherein said second measuring cup is nestable at least partially within said first measuring cup and wherein said second handle is disposable within the channel in said first handle such that said second handle does not extend beyond the perimeter of said first handle and such that said second cup portion is supported in a cantilevered manner within said first cup portion by engagement of the second handle with the first handle, wherein the second cup portion does not engage a side wall of said first cup portion of said first measuring cup.

2. The set of measuring cups of claim 1 further comprising a lid engageable with the first cup portion of said first measuring cup.

3. The set of measuring cups of claim 1, wherein said channel of said first handle can have a cross-sectional shape selected from said group consisting of triangular, rectangular, square and oblong.

4. The set of measuring cups of claim 1, wherein a bumper extends around an outer edge of said second handle.

5. The set of measuring cups of claim 1, wherein said first cup portion includes a first diameter and said second cup portion includes a second diameter, wherein said second diameter is smaller than said first diameter.

6. The set of measuring cups of claim 1, wherein said side wall increases in diameter between a base of said side wall to an upper edge of said side wall of said first measuring cup.

7. The set of measuring cups of claim 1, further comprising indicia for measuring a volume of material said indicia being positioned on said first handle or said first cup portion of said first measuring cup.

8. The set of measuring cups of claim 7, wherein said indicia provides a plurality of volume measurements.

9. The set of measuring cups of claim 1, wherein said measuring cup is formed from one of said group consisting of plastic, polyethylene, polypropylene, glass, and metal.

\* \* \* \* \*